United States Patent [19]

Mulakken

[11] Patent Number: 4,966,102
[45] Date of Patent: Oct. 30, 1990

[54] COMPRESSION/COMBUSTION ASSEMBLY

[76] Inventor: Joy P. Mulakken, 6149 Potrero Dr., Newark, Calif. 94560

[21] Appl. No.: 307,897

[22] Filed: Feb. 7, 1989

[51] Int. Cl.$^5$ .............................................. F02B 53/00
[52] U.S. Cl. ................................... 123/18 R; 91/339; 417/481
[58] Field of Search ...................... 123/18 R, 225, 241; 418/248; 91/266, 339; 417/481

[56] References Cited

U.S. PATENT DOCUMENTS

| 2,060,937 | 11/1936 | Hinckley et al. | 123/225 |
|---|---|---|---|
| 2,500,458 | 3/1950 | Hinckley | 123/225 |
| 3,474,766 | 10/1969 | Smith | 123/241 |
| 3,660,978 | 5/1972 | Hinckley | 123/225 |
| 4,214,557 | 7/1980 | Beach | 123/18 R |
| 4,392,458 | 7/1983 | Gummeringer | 123/18 R |
| 4,487,167 | 12/1984 | Williams | 123/18 R |

FOREIGN PATENT DOCUMENTS

| 2362187 | 6/1975 | Fed. Rep. of Germany | 123/18 R |
|---|---|---|---|
| 160086 | 9/1984 | Japan | 417/481 |

Primary Examiner—Michael Koczo
Attorney, Agent, or Firm—Michael J. Hughes

[57] ABSTRACT

The preferred embodiment of the present invention is in the form of a rotary compression/combustion assembly (10) adaptable to be utilized as an internal combustion engine, a fluid pump or as fluid compressor device. The assembly (10) operates by the interaction of a variety of subassemblies, and is formed to be generally symmetrical about a central axis (11). A chamber subassembly (12), of cylindrical shape, is divided into five subchambers (54–62) by four vane subassmeblies (14). Each vane member (44) pivots about its own pivot axis to create a variable volume combustion/compression chamber (54–60) between the vane member (44) and the frame side wall (32) of the cylinder frame (24). A rotor subassembly (16), including a drive shaft (86) and a rotor blade (88) interacts with vane members (44) with the position of the rotor blade (88) determining, or being determined by, depending upon mode of use, the volume of each subchamber (54–60). A port/valve subassembly (18) controls fluid flow and, in combustion mode, an ignition subassembly (20) provides an igniting spark. A vane return mechanism subassembly (22) urges each of the vane members (44) to a position of maximal chamber volume when permitted by the position of the rotor blade (88). The assembly (10) can operate without a required flywheel and is easily assembled and disassembled for economical manufacture, maintenance and repair.

21 Claims, 5 Drawing Sheets

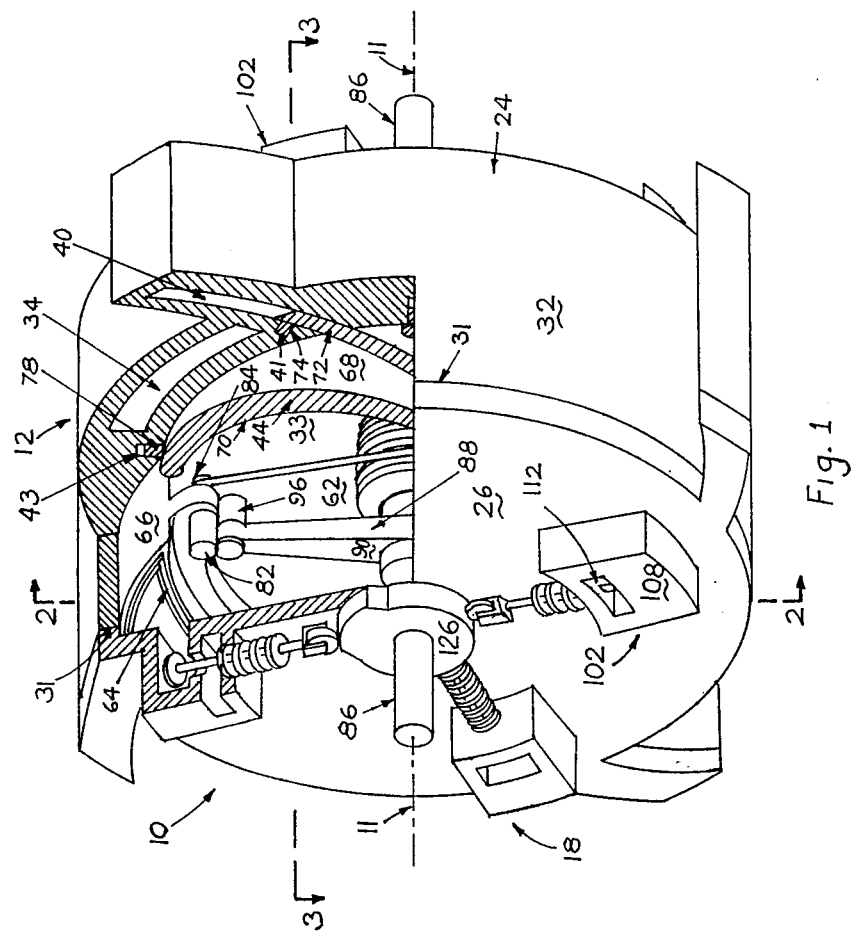

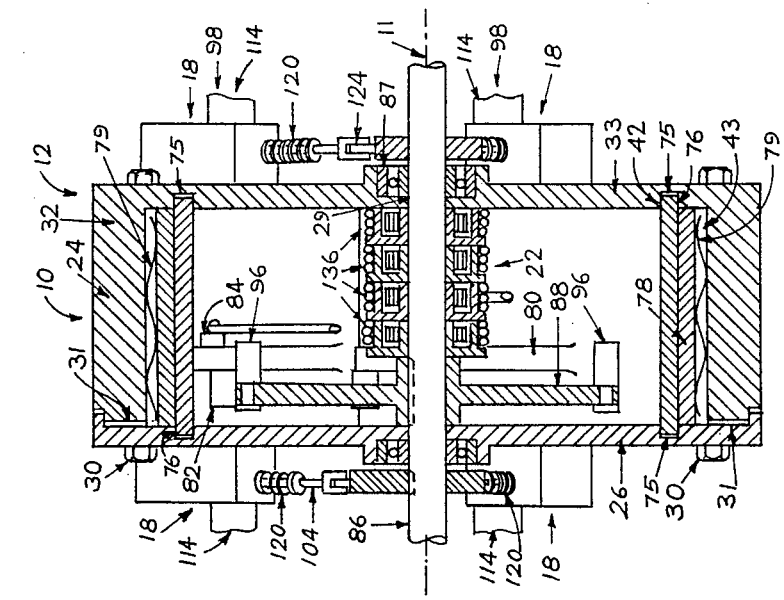
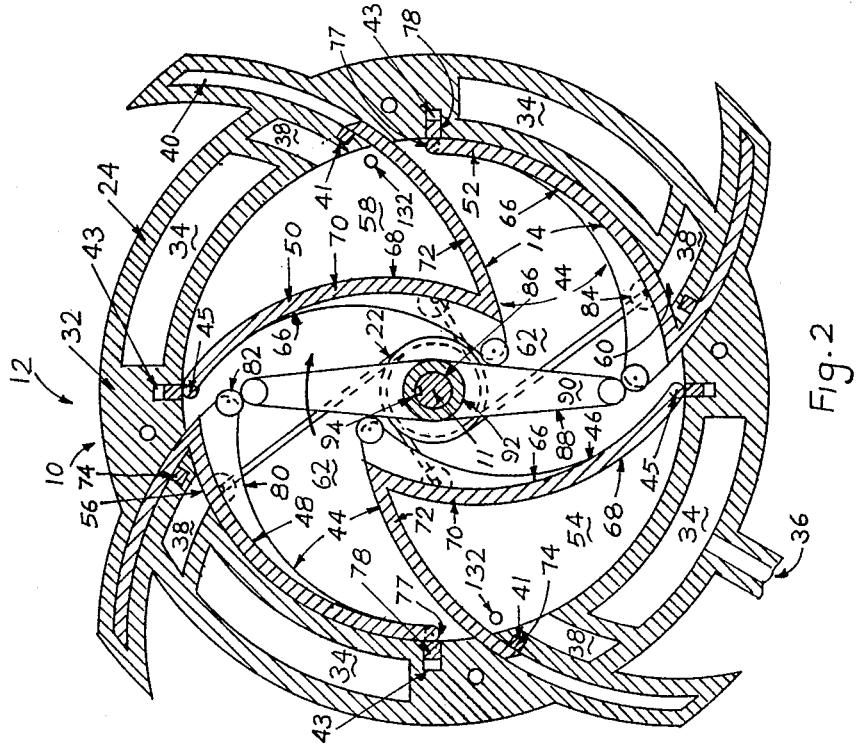
Fig. 3
Fig. 2

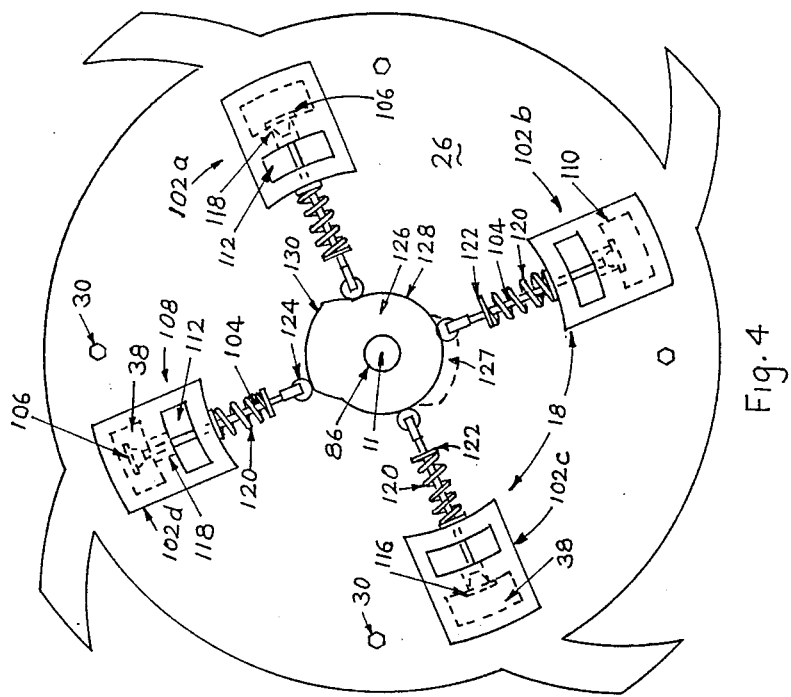
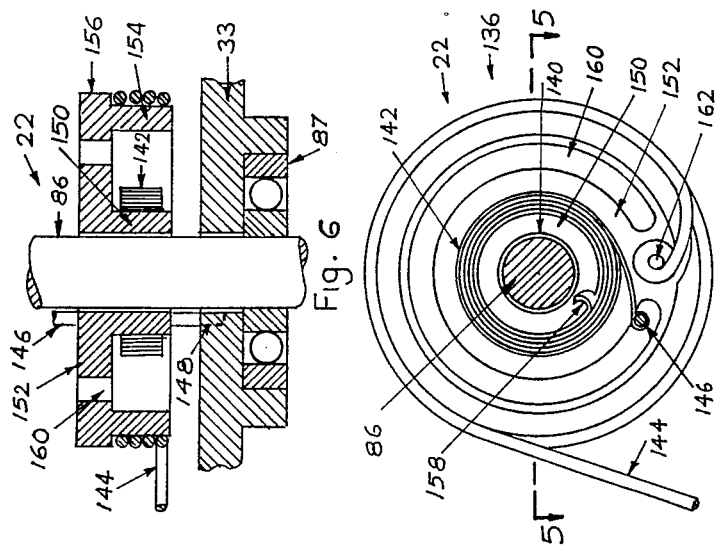

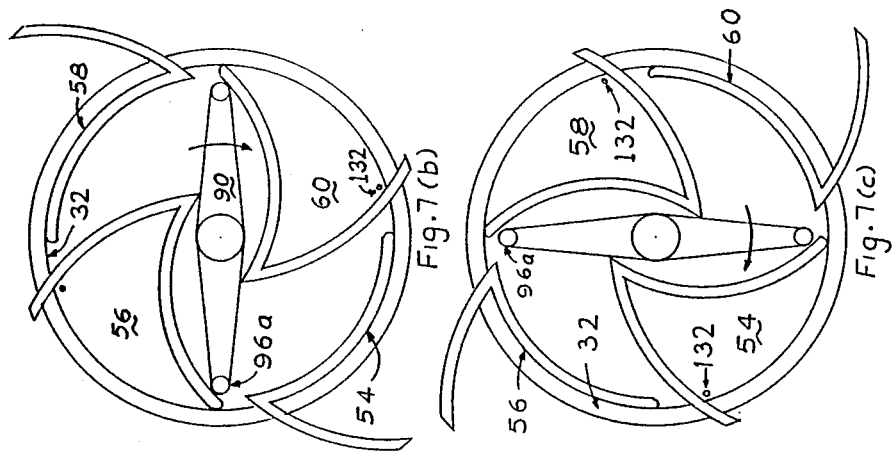
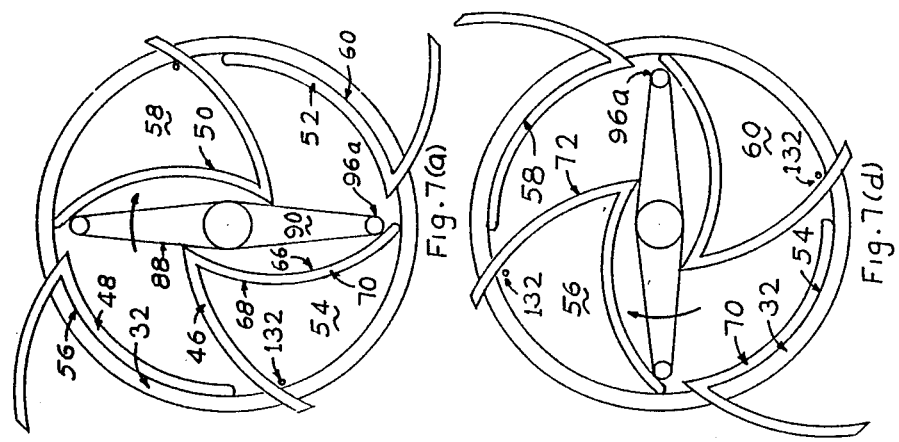

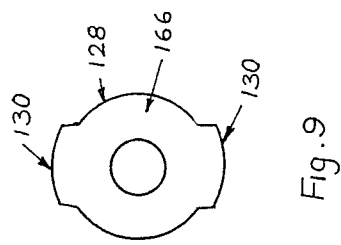
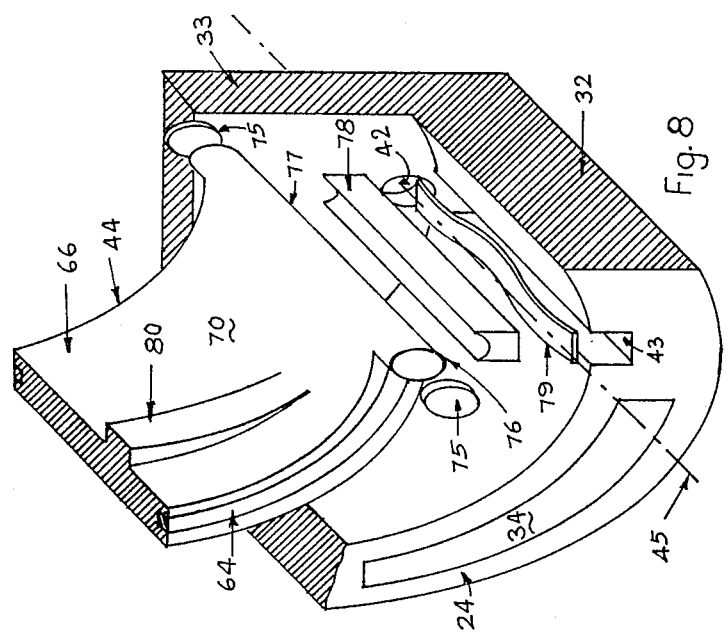

COMPRESSION/COMBUSTION ASSEMBLY

TECHNICAL FIELD

The present invention relates to rotary internal combustion engines and to fluid compression devices and more particularly to an assembly which may be utilized either as an internal combustion engine or a compression device.

BACKGROUND ART

The conversion of chemical energy into motive power has been a pursuit of mankind throughout its history. In the age of machines this art has been substantially refined by the invention of a great number of devices known as "engines". These have included the steam engine, the diesel engine and the standard component of the modern automobile, the reciprocating piston engine. Other modified versions such as the turbine engine and the jet engine have also been utilized.

One type of engine technology which has not been ignored in the art is that of the rotary engine. The most common form of this engine is known as Wankel and is found in some modern automobiles. However, numerous other attempts have been made to create rotary engines which have the advantage of having fewer moving parts and less translation of direction of motion than the standard reciprocating piston engine. Various examples of types of rotary engines which have been the subject of United States Patents are U.S. Pat. Nos. 898,985, E. Carpenter; No. 1,077,222, R. Davidson: 3,322,103 G. Dirnberger; 3,777,718 K. Pattas: 3,862,622, R. Spinnett; 3,886,912, R. Haglund: 4,136,661, C. Posson; 4,389,173, W. Kite: 4,422,419, S. Umeda: 4,453,508, T. Groger; 4,454,844, L. Kinsey; and 4,760,701, C. David.

As is amply demonstrated by the plethora of examples set forth above, the field of rotary engines has resulted in a great number of different approaches to the problems involved. However, none of the inventive approaches in this field has been entirely successful. Various types of rotary engines have suffered from a wide variety of different problems. Some, such as the Wankel engine, utilize an eccentric rotor mechanism which creates specialized gearing and wear minimization problems. Others, including the Wankel, require unusually shaped cylinders. Another common problem is that the seals between the rotor mechanism and the cylinder wall are vulnerable items which need to be replaced on a regular basis. As is evident from the wide variety of different approaches to the rotary engine concept, various attempts have been made to solve these and many other problems. However, to date, none have been wholly successful and the reciprocating piston engine remains the most popular solution for problems such as automobiles.

Since every combustion engine utilizes a compression stage in order to compress the fuel mixture prior to explosive expansion, there are many parallels between the internal combustion engine and gas compression devices. Gas compression devices have a wide variety of uses in compressing a variety of fluids. There is also a parallel between some compression devices and fluid pumps.

Just as in the internal combustion engine field, a wide variety of mechanisms have been utilized in the compression device field. One of the popular types of compressors is a rotary compressor type. Examples of rotary compressors which have been made the subject of U.S. Patents are U.S. Pat. No. 3,193,191, G. McClure: No. 3,374,943, K. Cervenka: No. 4,252,511, M. Bowdish: No. 4,362,473, S. Zeilon: and No. 4,764,095, K. Fickelscher.

The above represent various attempts to generate compressed fluids for various purposes in which the rotary mechanism within a cylinder is utilized. However, substantial room for improvement remains in the field.

DISCLOSURE OF THE INVENTION

Accordingly, it is an object of the present invention to provide a rotary device which may function either as a combustion engine or as a compression generation device.

Another object of the present invention is to provide a mechanically simple compression/combustion assembly.

A further object of the present invention is to provide a plurality of mutually isolated compression/combustion chambers within a single cylinder.

Yet another object of the present invention is to provide a combustion assembly in which a power stroke is delivered for each rotation of the rotor.

Briefly, a preferred embodiment of the present invention is a compression/combustion assembly adapted for utilization either as a fluid compression device or a fluid pump or as an internal combustion engine. The assembly is adapted to be utilized as a compressor or pump mechanism when external rotational power is supplied to the drive shaft while it is further adapted to be utilized as an internal combustion engine when provided with an ignition subassembly and a fuel supply. In combustion engine the motive power for the drive shaft is internally generated and is provided by chemical energy. The assembly is suitable for usage as an air compressor, a hydraulic or fluid pump or as an engine for such devices as automobiles, agricultural equipment and the like.

The preferred assembly includes five primary subassemblies and one optional subassembly. The five primary subassemblies, which are present both for usage in the compression mode and the combustion mode, are a chamber subassembly, a vane subassembly, a rotor subassembly, a port/valve subassembly and a vane return mechanism subassembly. The optional ignition subassembly is necessary only when utilized in combustion mode.

The preferred chamber subassembly is circular in cross-section and is constructed of a hollow cylinder frame and a separate end cap which may be secured to the cylinder frame to form an enclosed volume. The enclosed volume is divided into five distinct and isolated chambers by the vane subassembly which includes four distinct vane members. The rotor subassembly includes the drive shaft and a rotor blade component which abuts against the vane members. The rotation of the rotor determines the position of the vane members with respect to the chamber wall. The port/valve subassembly is driven in a cam and cam follower manner to appropriately open and close input and output ports to the various chambers formed by the vane members. The vane return mechanism subassembly insures that the vane members are urged to a position providing maximum expansion of the associated chambers when the rotor blade does not force them to a different position.

The ignition subassembly provides an explosive spark to the interior of the combustion chambers when the assembly is utilized in a combustion mode.

When utilized in a combustion mode the four vane members of the preferred embodiment will provide four distinct chambers which at any given time will be, respectively, in intake, compression, combustion and exhaust mode. Each of the chambers will sequentially be in the four modes during a single rotation of the rotor blade. In the compression mode the chambers will alternately be in intake and compression mode with the two modes being sequentially repeated twice during a single rotation of rotor blade.

An advantage of the present invention is that the operation thereof is mechanically simple such that gearless motion translation may be achieved and mechanical breakdown may be minimized.

Another advantage of the present invention is that replacement of a single component, the cam element, can convert the assembly from combustion to compression mode.

A further advantage of the present invention is that it is easily disassembled for maintenance and that the component parts are simple in construction for easy repair and replacement.

Yet another advantage of the present invention is that it can be easily manufactured because of its simple cylindrical shape.

A still further advantage of the present invention is that the mechanical components, with the exception of the port/valve subassembly, may be contained entirely within the interior of the chamber subassembly.

A still further advantage of the present invention is that the motion of the components is limited to simple rotation of the rotor subassembly and simple pivoting of each of the vane members, thus simplifying construction, utilization and repair.

Another advantage of the invention is that it provides a power stroke for each rotation of the motor, thus eliminating the need for a flywheel to balance the rotational force.

These and other objects and advantages of the present invention will become clear to those skilled in the art in view of the description of the presently best known mode of carrying out the invention and the industrial applicability of the preferred embodiment as described herein and as illustrated in the several figures of the drawing.

BRIEF DESCRIPTION OF THE DRAWINGS

FIG. 1 is a partially cut-away perspective view of a compression/combustion assembly according to the present invention;

FIG. 2 is a cross sectional view taken along line 2—2 of FIG. 1, illustrating the interior of the compression/combustion assembly;

FIG. 3 is a cross sectional view taken along line 3—3 of FIG. 1;

FIG. 4 is an end plan view of a portion of the port/valve subassembly;

FIG. 5 is a top plan view of a portion of the vane return mechanism subassembly;

FIG. 6 is a cross sectional view taken along line 5—5 of FIG. 5;

FIG. 7 (a–d) is a schematic representation of the preferred assembly shown through a complete rotation of the rotor subassembly during combustion mode.

FIG. 8 is an exploded sectional perspective view showing the vane mounting details; and FIG. 9 is an end plan view of a compressor outlet cam.

BEST MODE OF CARRYING OUT THE INVENTION

The present invention is a compression/combustion assembly which is adapted to function either as an internal combustion engine or as a fluid compressor such as a gas compressor or fluid pump. The assembly is adapted to function as a fluid compressor when positive power is provided to the drive shaft and to function as an internal combustion engine when provided with fuel and ignition such that chemical reaction energy provides rotational power to the drive shaft. A preferred embodiment of the invention, configured for operation as an internal combustion engine, is illustrated in a perspective view, partially cut away, in FIG. 1.

As illustrated in FIG. 1, the preferred embodiment of the compression/combustion assembly is shown in a partially cut away perspective view and is designated by the general reference character 10. The compression/combustion assembly 10 is generally symmetrical about a central axis 11 and may be seen to be comprised of a number of interacting subassemblies which are best understood from consideration of FIGS. 2 through 6, as well as FIG. 1.

The first of these subassemblies is a chamber subassembly 12 which provides the external support structure and the internal volume in which the other subassemblies operate. The second is a vane subassembly 14 which divides the chamber 12 into a variety of subchambers of variable volume depending on the positions of the components of the vane subassembly 14. A rotor subassembly 16 provides the modification of the chamber volume by acting upon the vane subassembly 14 when the compression/combustion assembly 10 is operated in the compressor mode and is the mechanism for translating the power derived from the combustion strokes into rotary motion when the assembly 10 is operated in the combustion engine mode. A port/valve subassembly 18 controls the flow of fluids into and out of the chamber subassembly 12. When the device is utilized in combustion engine mode, an ignition subassembly 20 provides the ignition spark to initiate combustion. Finally, a vane return mechanism subassembly 22 provides the mechanical means by which the components of the vane subassembly 14 are returned to expanded-chamber positions when the rotor subassembly 16 is not directly acting thereon. The inventive assembly 10 is best understood by consideration of the various subassemblies.

The chamber subassembly 12 and the vane subassembly 14 are best illustrated in FIGS. 1, 2, 3 and 8. In these illustrations it may be seen that the chamber subassembly 12 includes a cylinder frame 24 which is adapted to mate with a cylinder cap 26 to form therewith a cylindrical volume 28. Both the cylinder frame 24 and the cylinder cap 26 are provided with a shaft aperture situated about the central axis 11 to provide access to the rotor subassembly 16 from the exterior of the cylindrical volume 28. The cylinder cap 26 is securely mated to the cylinder frame 24 by a series of securing fasteners 30. A gasket 31 is provided in order to seal the volume 28. The cylinder frame 24 primarily includes a frame sidewall member 32 including a variety of channels, detents and apertures formed therein. A frame end wall 33 is situated opposite the cylinder cap 26.

As is seen especially in FIG. 2, the frame sidewall 32 includes a plurality of coolant channels 34 formed in the interior thereof for providing heat exchange to the assembly 10. The coolant channels 34 are interconnected and are further connected to a source of coolant fluid by one or more coolant ports 36. The system of coolant channels 34 provides the means by which the cylinder frame wall 32 is prevented from adverse consequences from thermal expansion and heat degradation. A coolant, such as water or antifreeze, is ordinarily utilized, particularly in the combustion mode.

The frame wall 32 is further provided, in the preferred embodiment 10, with four fluid passages 38 extending into each of the ends of the cylinder frame 24. The fluid passages 38 connect the cylindrical volume 28 to the exterior of the end cap 26 and the frame end wall 33 without substantially increasing the volume since they do not extend across the side wall 32 for more than a short distance. The fluid passages 38 are utilized in the combustion mode for the input of the fuel and air mixture and for outlet of the exhaust gases. In the compressor mode the fluid passages 38 are utilized for the inlet of uncompressed gases and the outlet of compressed gases. In the event that the compression/combustion assembly 10 is utilized as a hydraulic pressure generation device or as a fluid pump then the gases may be replaced with a liquid mixture or other fluid component. Passage into and out of the fluid passages 38 is controlled by the port/valve subassembly 18 and the action of the vane subassembly 14.

The frame side wall 32 and the corresponding adjacent surfaces of the cylinder cap 26 and the end wall 33 are also provided with four radially spaced vane receiving slots 40 for slidably receiving a portion of the vane subassemblies 14. Each vane receiving slot 40 includes a wipe bushing seal detent 41. A set of four vane mounting detents 42 are formed opposingly in each of the cylinder cap 26 and the cylinder frame end wall 33. Intermediate each opposed pair of vane mounting detents 42 the side wall 32 is provided with an axial pivot bushing slot 43 extending the entire axial length of the side wall 32. Each of the sets of four corresponding vane receiving slots 40 and vane mounting detents 42 provides support and positioning for a single vane member 44, four of which comprise the preferred vane subassembly 14.

As is shown especially in FIGS. 1 and 2, the vane receiving slots 40 extend substantially outward from the cylindrical volume 28. This requires a deformation of the cylinder frame 24 in order to maintain sealed integrity about the vane receiving slots 40. The shaping of the vane receiving slots 40 is selected to allow each vane member 44 a limited degree of rotation about a vane rotation axis 45. Each of the vane members 44 has its vane rotation axis 45 aligned parallel to the central axis 11 and passing through the opposed vane mounting detents 42. In the preferred embodiment the degree of rotation of the vane members 44 about the vane rotation axis 45 is about 40°, with the degree being limited by the rotor subassembly 16 and the cylinder side wall 32.

The vane subassembly 14 is especially shown in FIGS. 2, 3 and 8 and is adapted to be contained within the interior of the cylindrical volume 28, with the four vane members 44 serving to divide the cylindrical volume 28 into five mutually isolated variable volume subchambers As is especially illustrated in FIG. 2, the vane subassembly 14 includes the four distinct vane members 44, designated as a first vane 46, a second vane 48, and third vane 50, and a fourth vane 52.

The various vane members 46–52 and the cylinder frame 24 serve to create various mutually isolated subchambers within the cylindrical volume 28. The first vane 46 creates a first chamber 54, the second vane 48 creates a second chamber 56, the third vane 50 creates a third chamber 58, and the fourth vane 52 creates a fourth chamber 60. The central portion of the cylindrical volume 28, in which the rotor subassembly 16 is situated, forms a central chamber 62. Each of the four vane members 44 and small portions of the frame wall 32 situated between adjacent vane members 44 (see FIG. 2) define the bounds of the central chamber 62.

Each of the vane members 44 extends axially the entire height of the cylindrical volume so as to completely seal the associated chambers from each other. To this end, each vane member 44 includes, at the ends thereof, edge bushings 64 which permit the vane members 44 to slide within the portions of the vane receiving slots 40 formed in the cylinder cap 26 and the end wall 33 in such a manner that such a complete seal is maintained therebetween during such sliding.

Each of the vane members 44 is formed to have a first surface 66 defined as that surface of the vane 44 which faces the central chamber 62, and an second surface 68, defined as the radially exterior portion of the vane which faces the associated chamber (54–60). In operation the second surface 68 is the actual working surface of the vane member 44 and may be specially treated to withstand combustion and contaminant build-up while the first surface 66 is isolated from the combustion process and/or the compressed fluids.

Each of the vane members 44 is formed in a curved shape as illustrated best in FIG. 2 and includes a concave portion 70 which is concave with respect to the associated chamber and a convex portion 72, convex with respect to the associated chamber. The convex portion 72 is formed in an arc of a circle about the associated vane rotation axis 45 and is adapted to slide readily within the vane receiving slot 40. The sliding of the convex portion 72 within the vane receiving slot 40 is facilitated by a vane wipe bushing 74 mounted within the wipe bushing detent 41 located along the receiving slot 40 The wipe vane bushings 74 permit respective sliding motion between the vane members 44 and the side wall 32 while maintaining a pressure seal for the chamber.

The concave portion 70 and the convex portion 72 are integrally formed into the single vane member 44. The second surface, 68 of the concave portion 70 is formed in an arc shape about the central axis 11 so as to be congruent with the curvature of the frame sidewall 32. This shaping permits the concave portion 70 to abut against the arc shaped frame wall 32 when the vane member 44 has been rotated to the appropriate position. This is shown in FIG. 2 by the positioning of the second vane 48 and the fourth vane 52. Similarly, the shaping of the convex portion 72 is selected to provide maximum clearance to the next adjacent vane member 44 and also to slidably engage the vane receiving slot 40 in such a manner as to maintain an excellent pivot radius about the vane rotational axis 45 as well as positioning for the vane member 44.

Each of the vane members 44 is mounted within the chamber subassembly 12 and is pivotally mounted in the vane mounting detents 42, which are provided with detent bushings 75 (See FIG. 8). Each vane member 44 is held in position by a pair of opposed vane pivot posts 76 extending axially into the vane receiving detents 42 formed in the cylinder cap 26 and the end wall 33. The pivot posts 76 are aligned along the vane rotation axis 45 in such a manner that they permit the pivoting of the vane member 44 about the axis 45.

An arc shaped edge 77 is formed on the edge of the concave portion 70, which lies along the vane rotation axis 45. The arc shaped edge 77 has an exterior surface in the form of an arc of a circle about the vane rotational axis 45 such that a consistent seal is maintained between the arc shaped edge 77 and a spring loaded pivot bushing 78 mounted within the associated pivot bushing receiving slot 43 The spring loaded pivot bushing 78 is mounted in the slot 43 with a leaf spring 79 being placed in the slot 43 before hand such that the pivot busing 78 is urged against the arc shaped edge 77 in such a manner that a consistent and complete seal is maintained therebetween regardless of the rotational position of the vane member 44.

The first surface 66 of the vane members 44 is adapted to interact with the rotor subassembly 16. To this end, a ramp portion 80 is provided on the first surface 66 of the concave portion 70 at the extent thereof furthest removed from the vane rotation axis 45 (See especially FIGS. 2, 3 and 8). A vane roller 82 is provided to extend axially from the ramp portion 80 at the terminal point of the ramp portion 80 so as to interact with the rotor subassembly 16, as will be described hereinafter.

Each of the vane members 44 is further provided with a return attachment protrusion 84 on the first surface 66. The return attachment protrusion 84 provides the means for attaching the vane member 44 to the vane return mechanism subassembly 22. In all respects, other than the placement of the return attachment protrusion 84, the various vane members 44 are identical in formation. However, since the vane return mechanisms 22 associated with each of the vanes 44 are axially separated, see FIG. 3, the return attachment protrusions 84 are at different axial positions on the particular vane members 46, 48, 50 and 52.

As is seen especially in FIGS. 2 and 3, the rotor subassembly 16 is centered about a drive shaft 86 lying along the central axis 11. A shaft bearing 87 is mounted within each of the shaft apertures 29 of the cylinder cap 26 and the frame end wall 33 to receive the drive shaft 86 so as to provide smooth rotation and firm registration of the drive shaft 86 along the central axis 11 A rotor blade member 88 is mounted upon the drive shaft 86 such that the rotor blade 88 rotates within the cylindrical volume 28 and contacts the first surfaces 66 of the vane members 44. The rotor blade 88 includes a pair of opposed arm portions 90 and a central mounting cylinder portion 92. The rotor blade 88 is secured to the drive shaft 86 by one or more securing keys 94 extending through the mounting cylinder 92 into the drive shaft 86.

At the end of each of the arm portions 90, the rotor blade 88 is provided with a terminal roller member 96. As is especially seen in FIGS. 1 and 3, the terminal roller 96 extends axially from the end of the arm portion 90 so as to engage the ramp portion 80 of the vane members 44. Similarly, the vane roller 82 extends axially from the ramp portion 80 and abuts against the end of the arm portion 90. In this manner the rollers 82 and 96 do not actually contact each other except over a small portion, as seen in FIG. 3, but each provides minimally frictional interaction between the rotating rotor blade 88 and the pivoting vane members 44. The port/valve subassembly 18 is primarily illustrated in FIGS. 3 and 4. The port valve subassembly includes a set of corresponding inlet port mechanisms 98 and outlet port mechanisms 100, each of which controls the flow of gases or fluids into and out of the fluid passages 38. The designation of one set as the inlet port mechanisms 98 and the other as the outlet port mechanism 100 is arbitrary and may be controlled by the manufacturer, however, in the illustration of FIG. 4, the outlet port mechanism 100 is shown as being situated on the cylinder cap 26.

If may be seen that the outlet port mechanism 100 (and, correspondingly, the inlet port mechanism 98) includes four sets of substantially identical valve control structures 102. Each of the valve control structures 102 controls the flow within a particular fluid passage 38 associated with one of the first through fourth chambers 54, 56, 58 or 60.

As is especially seen in FIG. 4, each of the valve control structures 102 includes a valve stem 104 attached to a valve head 106 extending into a valve manifold 108. The valve manifold 108 includes a passage cap portion 110 which corresponds to the end of the associated fluid passage 38. The valve manifold 108 further includes an external port 112 which connects the valve manifold 108 with an external passage 114, see FIG. 3, which may connect either to the fuel or inlet gas supply or the exhaust system. The function of the valve head 106 is to control the flow of fluids between the passage cap portion 110 and the external port 112.

In the embodiment illustrated in FIG. 4, the valve head 106 has a triangular cross-section with the apex of the triangle at point where the valve head 106 connects to the valve stem 104 such that the valve head 106 fits neatly into a valve depression 116. A passage tube 118 extends between the valve depression 116 and the external port 112. The passage tube 118 has a sufficient diamater that gases or fluids may flow around the valve stem 104 which extends through the passage tube 118.

Externally to the valve manifold 108, the valve stem 104 includes a compression spring 120 extending about the valve stem 104 between a spring stop washer 122 affixed to the valve stem 104 and the wall of the valve manifold 108. The compression spring 120 serves the purpose of urging the valve stem 104 away from the valve manifold 108 such that the valve head 106 is urged to be firmly seated within the valve head depression 116.

At its end opposite the valve head 106, the valve stem 104 terminates in a cam follower 124. The cam follower 124, as shown in FIG. 4, is in the form of a wheel-like mechanism adapted to interact with a cam 126 which is keyed on to the drive shaft 86. As is seen in FIG. 4, the cam member may either be the combustion type cam 126 shown in solid lines or an alternate type cam 127 shown in phantom. The combustion type of cam 126 utilized in the port/valve assembly 18 includes a cam wheel portion 128 over approximately two hundred seventy degrees (270°) of arc and a cam step portion 130 over approximately ninety degrees (90°) of arc. The cam wheel portion 128 has substantially less diameter than the cam step portion 130. This construction is consistent with a structure in which the associated valve is to be opened only once in a four stroke operation, such as when then the compression/combustion assembly 10 is utilized in combustion mode.

If the compression/combustion assembly 10 is to be utilized in a pumping mode then the alteration which would be made in the port/valve subassembly 18 would be to construct the alternate pumping type cam 127 having two equivalent cam step portions 130 opposite each other, as shown in phantom in FIG. 4. This would result in a two stroke structure with the associated valves being open twice for every complete rotation of the drive shaft 86 as opposed to once for every complete rotation as in the combustion mode. A further type of cam, utilized for exhaust of compressed fluids, is discussed hereinafter in respect to FIG. 9.

As is seen in FIG. 4, three of the four associated valve control structures 102 have the cam followers 124 abutting against the cam wheel portion 128 of the cam 126. With this abutment the compression spring 120 forces the valve stem 104 outward and maintains the valve head 106 in tight abutment within the valve depression 116. In this arrangement no fluid flows through the passage tube 118 to the external port 112. However, with respect to the fourth valve control structure 102d, shown in FIG. 4, the cam follower 124 is abutted against the cam step portion 130. In this orientation the force of the cam 126 on the cam follower 124 overcomes the force of the compression spring 120 such that the valve stem 104 is forced inward so the valve head 106 disengages from the valve head depression 116 and a flow path is open between the fluid passage 38 to the external port 112 through the passage tube 118.

The above description relates to the outlet port mechanism 100 but would be equally applicable to the inlet port mechanism 98. The only difference would be the orientation of the cam 126 with respect to the specific valve control structures 102 involved. In the combustion mode discussed above the cam step portion 130 would be offset by ninety degrees (90°) for the inlet port mechanism 98 as compared to the outlet port mechanism 100.

The ignition subassembly 20 is necessary only in the combustion mode. This subassembly is illustrated in FIG. 2 and FIG. 3 and provides the mechanism by which the compressed gases are ignited to provide the power. The ignition subassembly 20 is conventional in that it includes a spark plug 132 which is ignited by an electrical signal delivered on timing provided by an conventional type distributor 134 (not shown).

Another subassembly which is utilized in both the combustion mode and the compression mode is the vane return mechanism subassembly 22. The structure of the vane return mechanism subassembly 22 is seen in FIGS. 2 and 3 but is primarily illustrated in FIGS. 5 and 6. The vane return mechanism subassembly 22 provides the method by which the vane members 44 are urged to a position radially nearest the drive shaft 86 such that the maximum volume of the compression chambers 54-60 is assured. The primary usefulness of the vane return mechanism subassembly 22 is during the intake steps of all operational modes.

As is especially seen in FIG. 3, the vane return mechanism subassembly 22 includes four return structures 136, with one return structure 136 being associated with each one of the four distinct vane members 44. The return structures 136 are aligned adjacent to each other along the drive shaft 86 with each of the return structures 136 being axially aligned opposite the return attachment protrusion 84 of the associated vane member 44.

Each of the return structures 136 includes a pulley member 138, a pulley bushing 140, which permits the pulley 138 to rotate freely with respect to the drive shaft 86, a coil spring 142, and a return cable 144 which connects both to the pulley 138 and to the return attachment protrusion 84 on the associated vane member 44. As in seen especially in FIGS. 5 and 6, a fixed post 146 is mounted within a post mounting detent 148 in the frame end wall 33. The fixed post 146 extends through each of the four return structures 136 and provides an anchoring and positioning registration means for the return structure 136.

Each of the pulley elements 138 is constructed to include an internal cylinder 150, a disk portion 152, and an external cylinder portion 154, including a cable support flange 156 extending therefrom. These portions are integrally formed into the unitary pulley 138.

The internal cylinder 150 is situated adjacent to the pulley bushing 140 and provides registration for the pulley 138 with respect to the drive shaft 86. The disk portion 152 extends radially outward from one axial edge of the internal cylinder 150 and extends to the external cylinder 154. The cable support flange 156 may be thought of as being an extension of the disk portion 152. The disk portion 152 is narrow in axial thickness so as to provide an area in which the coil spring 142 may operate. The coil spring 142 is affixed to the internal cylinder 150 at a spring detent 158 formed in the internal cylinder 150. As is especially seen in FIG. 5, the coil spring 142 is wound about the internal cylinder 150 and then extends to be attached to the fixed post 146. The disk portion 152 is provided with a post slot 160 which extends in a circular arc extending nearly completely about the pulley 138. The post slot 160 provides an axial passage for the fixed post 146 and also limits the rotational freedom of motion available to the pulley 138.

The flexible return cable 144 extends from the return attachment protrusion 84 on the associated vane member 44, is wound about the exterior surface of the external cylinder 154, and the opposing end is attached to a cable anchor post 162 mounted on the disk portion 152. A cable slot 164 is provided in the external cylinder 154 to allow passage of the cable 144 therethrough for attachment to the cable anchor post 162.

The various components of the present invention are preferably constructed of temperature degradation resistant metallic materials with the majority being custom cast steel and/or die-cast aluminum alloy. Those elements which are situated within the central chamber 62 are not exposed to the high temperature of combustion even when the compression/combustion assembly 10 is utilized in combustion mode, therefore these do not have to have the same degree of temperature resistance as those which are exposed to the first chamber 54, second chamber 56, third chamber 58, and fourth chamber 60. Since the central chamber 62 needs no specific pressure sealing it is also possible to provide air cooling to the central chamber 62. This may be accomplished by optional modifications such as cooling vents provided in the frame end wall 33 and the cylinder cap 26 and associated fan means.

The precise location and dimensions of various elements of the invention are very much a matter of choice of manufacture. The location of items such as the fuel passages 38 and the return mechanisms 136 are optional and may be selected to suit particular purposes. Alternate components for non-critical items such as the rollers 82 and 96 may be utilized. Furthermore, entire alternate subassemblies for the port/valve subassembly 18, the ignition subassembly 20 and the vane return mechanism subassembly 22 are envisioned. None of these substitutions detract from the purpose and usability of the invention.

Those skilled in the art will readily observe that numerous other modifications and alterations of the assembly and its components may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The industrial applicability of the compression/combustion assembly 10 of the present invention is clear from the above description. Substantial and widespread uses exist for both internal combustion engines and for fluid compression devices. The present invention is adaptable for use in all of these.

One of the advantages of the present invention is its ease of assembly and repair. This may be accomplished by removal of the cylinder cap 26, thus exposing the interior volume. From the illustration of FIG. 3 it may be seen that the drive shaft 86 and the associated components of the rotor subassembly 16 and the vane return mechanism subassembly 22 may be slidably mounted on the portion of the drive shaft 86 situated within the enclosed volume 28 and then secured in axial position. The wipe bushings 74 may be slidably inserted into the wipe bushing detents 41 and the leaf spring 79 and the pivot bushing 78 are slidably mounted within the axial pivot bushing slots 43. Each of the vane members 44 may then be slidably placed within the vane receiving slots 40 until the bottom pivot post 76 rests against the detent bushing 75 within the associated vane mounting detent 42 of the frame end wall 33. The return cable 144 may then be attached to the return attachment protrusion 84 at the proper degree of tension. Finally, the cylinder cap 26 may be replaced such that the top pivot posts 76 fit within the vane mounting detents 42 of the cylinder cap 26 and the gasket 31 forms a good seal between the cylinder cap 26 and the cylinder frame 24. The securing fasteners 30 may then be attached and tightened to complete the assembly.

Since the mechanism of the port/valve subassembly 18 are on the exterior surfaces of the cylinder cap 26 and the frame end wall 33, these are easily accessible for maintenance and repair. It is noted that the nature of operation of the compression/combustion assembly 10 is such that little or no continuous lubrication is required.

The operation of the compression/combustion assembly 10 is best understood from the illustrations of FIG. 7 (a, b, c and d). This illustration shows, in a schematic fashion, the completion of a single rotation of the drive shaft 86 to permit each of the combustion compression chambers 54, 56, 58 and 60 through the four strokes of the combustion process. The following discussion relates to the first chamber 54 while it is understood that the other chambers will follow the same pattern with a serial offset of 90° of rotation for each.

In combustion mode, it may be seen that at the beginning of the intake stroke the vane member 44 is situated such that the concave portion 70 abuts against the frame side wall 32 (FIG. 7d) such that the volume of the first chamber 54 is minimum, as a result of the completion of the exhaust stroke. At this point, the valve control structure 102 associated with the inlet fluid passage 38, by convention, that on the cylinder frame end wall 33, is opened by the action of the cam 126 upon the associated cam follower 124. The fuel mixture from the external passage 114 is then permitted to pass through the passage tube 118, about the valve head 106, and into the fluid passage 38 and consequently into the first chamber 54. The action of the vane return mechanism 136 causes the first vane 46 to pivot to the position illustrated in FIG. 7a where the volume of the first chamber 54 is maximized.

When the intake stroke is completed the cam 126 rotates past the position in which the cam step portion 130 abuts against the cam follower 124 and the action of the compression spring 120 causes the valve head 106 to be urged into the valve head depression 116, thus closing the valve. At the completion of the intake stroke the first end of the arm portion 90 corresponding to the first terminal roller 96a begins to contact the first vane 46 and to roll along its first surface 66 in order to begin forcing the vane member 46 to pivot about the vane rotational axis 45. The continued rotation of the rotor blade 88 causes the second surface 68 of the concave portion 70 to again be forced into abutment against the interior surface of the frame side wall 32 so that the volume of the first chamber 54 is once again minimized and the fuel mixture is compressed into a small volume.

When the compression stroke has been completed the spark plug 132 is activated by a signal from the distributor 134 and the fuel mixture is ignited. The chemical energy generated by the explosion of the fuel mixture causes a rapid gaseous expansion which forces the first vane 46 to pivot again about the vane rotational axis 45 such that the side of the arm portion 90 of the rotor blade 88 is forced along the first surface 66 of the concave portion 70 and the rotor blade 86 is consequently forced to rotate in a clockwise direction. During this stroke the abutment of the vane roller 82 against the side of the arm portion 90 of the rotor blade 88 forces the rotation. At the end of the compression stroke the first chamber 54 is once again at maximum volume as illustrated in FIG. 7c.

The continued rotation of the rotor blade 88 then causes a repeat of the action of the compression stroke in that the first vane member 46 is again forced toward the frame side wall 32. During this stroke, known as the exhaust stroke, the port/valve subassembly 18 associated with the exhaust fuel passage 38 (by convention that associated with the cylinder cap 26) is open to allow the exhaust of the spent gases contained within the first chamber 54. When the further 90° rotation of the rotor blades 88 has been completed the gases are expelled completely from the first chamber 54 as illustrated in FIG. 7d, and the first chamber 54 is ready for a repeat of the process on the next rotation.

When the device is utilized as a fluid pump the same rotational aspects will result with respect to the rotor blade 88 and the first vane member 46. However, the operation of the port/valve subassembly 18 will be different. In fluid pump mode there is no need for combustion stroke since the power is being supplied externally to the drive shaft 86. In this operation, the cams 126 are replaced with pumping cams 127 which are symmetrical, having two opposed cam step portions 130. In this operation, only two strokes are required with an input or intake stroke occurring when the intake valve is open and the vane return mechanism subassembly 22 is forcing the first vane 46 radially inward to maximum volume of the first chamber 54 and a exhaust stroke in which the associated cam follower 124 is abutting against the cam wheel portion 128. The symmetrical two-lobed pumping cam 127 permits two complete intake and exhaust cycles during a single rotation of the rotor blade 88. This results in effective pumping of the fluid.

As is illustrated in FIG. 9 a further type of cam 166, known as a compressor outlet cam 166, is utilized when the device is to be operated as a fluid compressor. In this operation the intake cam may be the pumping cam 127 discussed above. However, for the compressed gas exhaust stroke it is desirable to have a substantial degree of compression completed prior to the opening of the associated port/valve subassembly 20. For this purpose, the compressor outlet cam 166 includes a pair of cam step portions 130 which occupy a smaller radial portion while the cam wheel portion 128 occupies a larger radial portion of the compressor outlet cam 166. In this manner, the associated valve is open only during the latter portions of the exhaust stroke such that the fluid is substantially compressed prior to being driven through the associated fluid passage 38 and delivered to the external passage 114. The degree of compression is determined by the size of the first chamber 56 and the radial extent of the cam step portion 130 on the compressor outlet cam 166.

From the above, it may be seen that the device is readily operated as an internal combustion engine and also as a fluid pump or fluid compressor device. Because of the myriad available uses for devices of this nature it may be seen that the compression/combustion assembly 10 of the present invention is likely to have extremely widespread industrial applicability and commercial utility.

What is claimed is:

1. A compression/combustion assembly adaptable to be utilized either as a fluid compression device or as an internal combustion engine, comprising:
   a chamber subassembly forming an elongated cylindrical volume about a central axis, said cylindrical volume having a plurality of extensions extending outwardly therefrom along the entire axial length thereof;
   a plurality of vane subassemblies, equal in number to said extensions, adapted to mount within the chamber subassembly such that each vane subassembly independently pivots about its own pivot axis, each vane subassembly including a vane member forming a compression/combustion subchamber between said vane member and the surface of said cylindrical volume, each said compression/combustion subchamber being isolated from each other of said compression/combustion subchambers, and in the case of an internal combustion engine each said compression/combustion subchamber functioning to both compress and combust fuel therein, a portion of said vane member extending into a corresponding one of said extensions;
   a rotor subassembly situated within said cylindrical volume and permanently isolated from each said compression/combustion subchamber such that the rotor subassembly is not exposed at any time to the contents of the compression/combustion subchambers, the rotor subassembly including a drive shaft aligned along said central axis, and a rotor blade mounted on said drive shaft, said rotor blade being formed such that the rotational position thereof corresponds to the pivotal position of each said vane members; and
   port/valve means associated with said chamber subassembly to control inputs to and outputs from said subchambers in a manner corresponding to the rotational position of said rotor blade.

2. The compression/combustion assembly of claim 1 wherein
   the number of said arc shaped extensions is four such that four said compression subchambers are formed radially about the exterior of said cylindrical volume and a variable volume central subchamber is formed about said drive shaft.

3. The compression/combustion assembly of claim 1 wherein
   the chamber subassembly further includes a frame side wall extending circumferentially about said cylindrical volume, said frame side wall including a plurality of fluid passages formed therein adjacent to said subchambers, said fluid passages connecting each said subchamber to the port/valve means.

4. The compression/combustion assembly of claim 1 wherein
   each said vane subassembly includes a vane member having a convex portion and a concave portion, said concave portion having a curvature equal to that of the inside surface of said cylindrical volume and said convex portion having a curvature in the form of an arc of a circle about said vane member's own said pivot axis.

5. The compression/combustion assembly of claim 4 and further including
   sealing means provided along the axial edges of said vane members, within said arc shaped extensions and along said pivot for providing that each said subchamber is isolated from each other said subchamber.

6. The compression/combustion assembly of claim 4 wherein
   said rotor blade is formed to include two opposed arm portions, the width of said arm portions decreasing in proportion to the distance from said drive shaft.

7. The compression/combustion assembly of claim 4 wherein
   said rotor blade is shaped so as to abut against a surface of the concave portion of said vane member so as to force the opposing surface against the surface of said cylindrical volume when an end of said rotor blade so abuts and to permit said vane member to pivot away from the surface of said cylindrical volume when a non-end portion of said rotor blade so abuts the vane member.

8. The compression/combustion assembly of claim 1 wherein
   each complete rotation of said drive shaft results in each said vane member pivoting twice in each direction such that said compression subchamber is compressed twice and expanded twice per rotation.

9. The compression/combustion assembly of claim 1 and further including
   an ignition subassembly for providing controlled delivery of an explosion inducing event to each said compression subchamber.

10. The compression/combustion assembly of claim 1 and further including
    a vane return mechanism subassembly for acting upon each said vane member so as to urge said vane members to a position wherein said associated compression subchamber has a maximal volume when the force of the vane return mechanism subassembly is not overcome by said rotor subassembly.

11. An assembly adapted to operate either as a compression device or as an internal combustion engine, comprising:
an elongated axial cylinder, being generally symmetrical about a central axis and having a circumferential side wall and a pair of opposed end walls;
a plurality of vane members, each adapted to pivot about an associated pivot axis, each said pivot axis being parallel to said central axis and being situated near to said side wall, with said pivot axes being equally circumferentially spaced, said vane members defining an equal plurality of mutually isolated variable volume chambers bounded by said vane members, said side wall and said end walls, the volume of each said chamber varying dependent on the pivotal position of the associated one of said vane members;
a rotor subassembly including a drive shaft situated along said central axis and rotor blade member mounted perpendicularly thereon, said rotor blade member abutting against said vane members such that the volume of said chambers and the rotational position of said rotor blade are directly interrelated wherein the rotor subassembly is completely isolated from the interior of said chambers such that the contents of the subchambers do not come into contact with the rotor subassembly during operation; and
port/valve means for controlling the flow of material into and out of said chambers.

12. The assembly of claim 11, wherein
each said vane member is formed to have a concave portion adapted to conform to the curvature of said side wall and a convex portion adapted to slidably engage a curved vane receiving slot formed in said side wall, such that at least a segment of said convex portion remains within said receiving slot when said chamber is at its maximum volume position.

13. The assembly of claim 12, wherein
said rotor blade includes a pair of opposed arm portions, the tips of said arm portions being adapted to slidably abut against said concave portions of said vane members, with the abutment of said tip with points on said concave portion farthest removed from said associated pivot axis corresponding with a minimum volume of said associated chamber.

14. The assembly of claim 11, wherein
said side wall further includes a plurality of fluid passages formed therein to facilitate material flow between said chambers and the port/valve means.

15. The assembly of claim 11, and further including vane return means for urging said vane members to positions corresponding to a maximum volume of said chambers when said urging is not overcome by the force of said rotor blade upon said vane members.

16. The assembly of claim 11, wherein
the port/valve means are located on said end walls and are mechanically controlled so as to open and close access to each said chamber in correspondence to the position of said rotor blade.

17. The assembly of claim 12, and further including sealing means associated with each said vane member for isolating said associated chamber, said sealing means including an edge bushing along each axial edge of said vane member to form a sliding seal between said vane member and said end walls;
a wipe bushing situated within said vane receiving slot for providing a sliding seal along said convex portion; and
a pivot bushing extending axially along the portion of said vane member surrounding said pivot axis from providing a pivot seal between said side wall and said vane member.

18. The assembly of claim 11, wherein
each said end wall is provided with a plurality of mounting detents aligned along said vane pivot axes; and
each vane member includes a pair of pivot posts extending axially therefrom, said pivot posts being adapted to be received by said mounting detents in such a manner that said vane member pivots thereabout.

19. The assembly of claim 13, wherein
the surface of each said concave portion facing said central axis is provide with a ramp portion and a vane roller extending axially from the extreme part of said ramp portion; and
each said rotor blade tip is provided with an axially extending terminal roller, said terminal rollers being axially positioned so as to engage said ramp portions while said vane rollers engage said rotor blade tips.

20. A rotary compression generation device comprising:
a cylinder member forming a cylindrical chamber about a central axis, said cylindrical chamber having a circular cross section, the cylinder member including four arc shaped vane receiving slots formed in the circumferential surface thereof, and being enclosed by a frame end wall and an opposed cylinder cap;
four vane members for placement within the cylinder members such that an extension of each vane member is slidably contained within an associated vane receiving slot, each vane member pivotally mounted such that a completely volumetrically isolated variable volume chamber is formed between the vane member and the adjacent surfaces of the cylinder member;
a rotor having a drive shaft aligned along said central axis and a rotor blade extending radially therefrom, said rotor blade including a pair of opposed arm members for engaging said vane embers so as to cause variations in the volume of said variable volume chambers in correlation to the position of said rotor blade; and
a plurality of valves for controlling material flow into and out of said variable volume chambers;
wherein the rotor is permanently volumetrically isolated from the interior of said variable volume chambers.

21. The assembly of claim 15 wherein said vane return means includes, for each vane member:
a pulley mechanism secured to said drive shaft so as to rotate therewith;
a return cable secured both to said pulley and to said vane member; and
recoil spring means for urging said return cable to maximally wrap about said pulley mechanism and said drive shaft such that the volume of said chamber associated with said vane is urged to approach its maximal amount.

* * * * *